Figure 1:
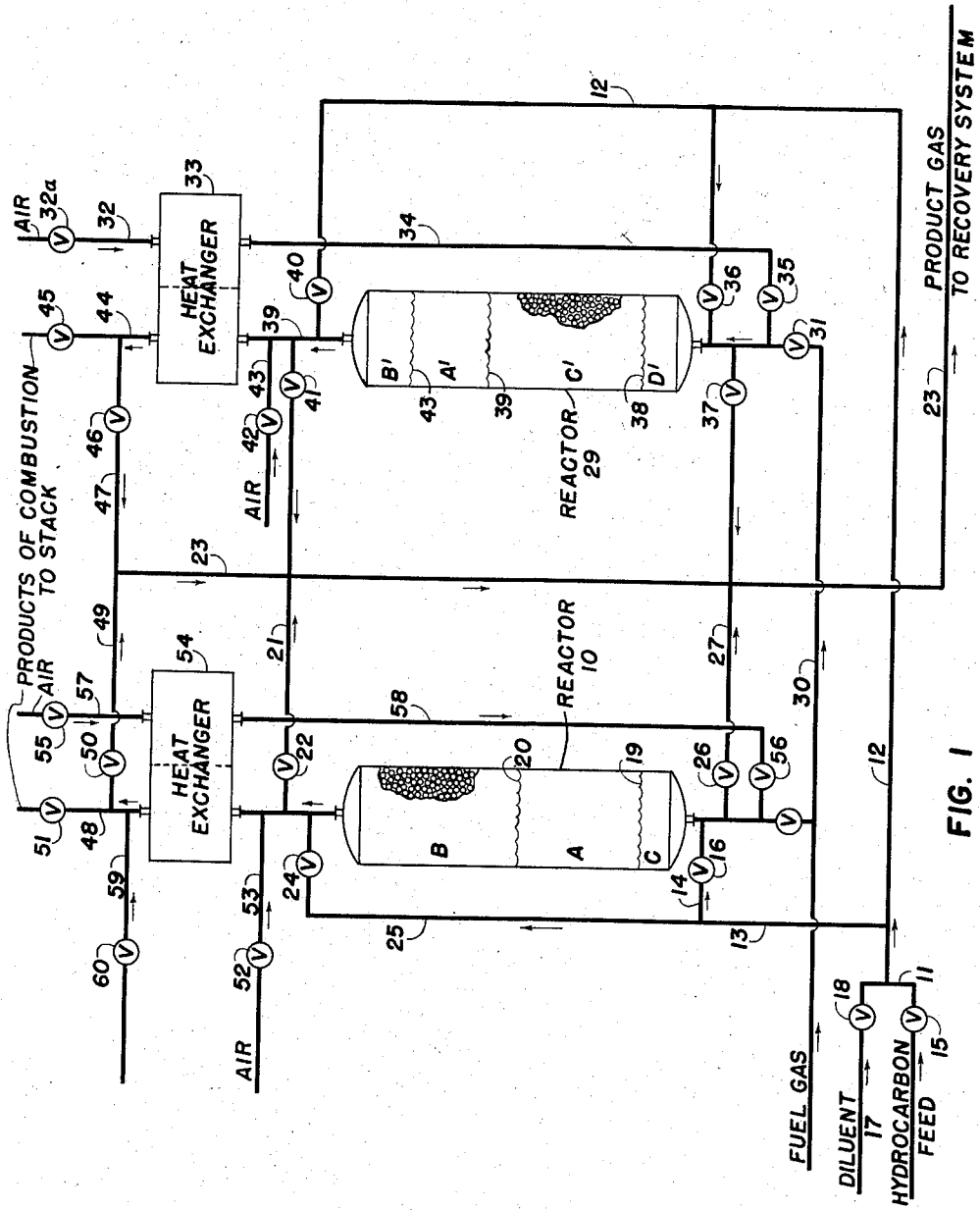

May 5, 1959

H. HENNIG 2,885,455

PROCESS FOR CHEMICAL PYROLYSIS

Filed Dec. 19, 1956

2 Sheets-Sheet 1

INVENTOR.
HARVEY HENNIG
BY
Edward H. Lang
ATTORNEY,

United States Patent Office 2,885,455
Patented May 5, 1959

2,885,455
PROCESS FOR CHEMICAL PYROLYSIS

Harvey Hennig, Crystal Lake, Ill., assignor to The Pure Oil Company, Chicago, Ill., a corporation of Ohio Application December 19, 1956, Serial No. 629,388

8 Claims. (Cl. 260—677)

This invention relates to a process for carrying out chemical reactions at high temperatures. It is more specifically concerned with a regenerative refractory system for effecting chemical pyrolysis.

In the chemical industry there are carried out chemical reactions which require high temperatures to initiate and promote the interaction between chemical reactants. The feed stocks which are processed using pyrolytic methods can consist of gaseous or liquid feed stocks. Reaction systems where feed stocks are subjected to pyrolysis include the preparation of dialkyl nitriles from cyanogen and olefins; the thermal treatment of light petroleum distillates, such as thermal or catalytically cracked gasolines, to produce low end-point gasolines having improved performance characteristics; the synthesis of acrylonitrile from hydrogen cyanide and ethylene, or cyanogen and ethane; the manufacture of cyanogen from hydrogen cyanide and nitrogen dioxide; and others. In several of these methods, such as the high-temperature processing of various hydrocarbon feed stocks to produce ethylene or other normally gaseous hydrocarbons, catalysts have been employed for carrying out the processing at lower temperature levels than are utilized in strictly thermal processes. However, in many of these methods, it is difficult to maintain catalyst life, and non-catalytic pyrolysis is deemed to be the most practical and economical method for carrying out these processes.

A number of methods are available for providing the heat necessary to carry out high-temperature reactions. Improvements in refractory materials for high-temperature service have made possible their use in regenerative, refractory, high-temperature processes. In systems of this nature, a refractory mass is heated to an elevated temperature by direct contact of the refractory elements with the hot products of combustion from some source of high temperatures, such as the combustion of natural gas and air mixtures. The heat which is accumulated in the refractory mass is then transferred by direct heat exchange to the reactants when they are passed through the refractory bed. Although regenerative, refractory, pyrolysis techniques can be carried out employing a moving bed of a granular refractory, which continuously circulates through the system and alternately passes through a reaction section and a regnerative or heating section, the use of a stationary refractory mass, employing alternating heating and processing periods, offers operating advantages over the moving-bed systems. As pointed out by Buehl et al., Bureau of Mines, Report of Investigations 4949, the moving-bed type of regenerative refractory system has the following disadvantages:

(1) Pebbles are abraded by movement at high temperatures, requiring continuous pebble replacement.

(2) The gas being heated is likely to mix with combustion gases, or air, which might be objectionable for some applications and could cause explosions when combustible gases are heated.

(3) If the heated gas must be delivered at a pressure appreciably above atmospheric, the air and fuel gas for heating the stoves must be compressed to a comparable pressure, and adjustment made if delivery pressure changes.

In either fixed or moving-bed types of regenerative, refractory, pyrolytic methods, one of the important operating problems in conventional pyrolysis systems arises from the high temperature of the effluent which has passed through the system. Although valves designed for high-temperature service are available for controlling the flow of the effluent, which may be at a temperature of 500° F. or more, valve maintenance and replacement problems encountered in the operation of these pyrolytic systems seriously affect the efficiency of regenerative refractory systems, especially in processes where temperatures greater than 1500° F. are encountered, for which no satisfactory valving means is known. It is, therefore, the primary object of this invention to provide a pyrolysis process wherein the flow-control means are maintained at low temperatures and significant fuel economies are realized by a novel process-flow arrangement and heat-recovery means. Another object of this invention is to eliminate the need for flow-control means in high temperature services. These and other objects will be apparent from the following detailed description of this invention.

Figure 2:
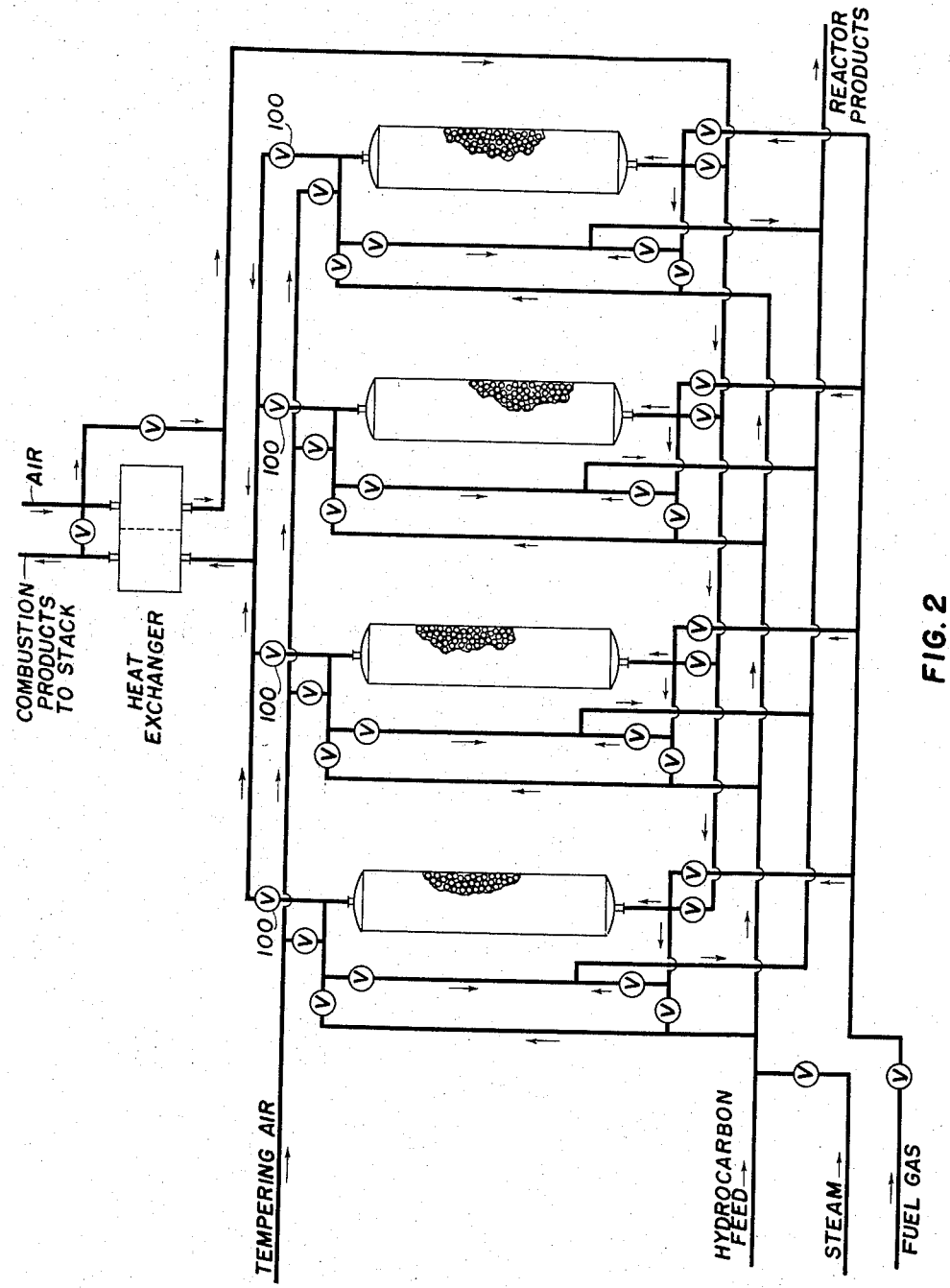

Figure 1 is a flow diagram schematically illustrating an apparatus for carrying out the process of this invention. Figure 2 is an alternative embodiment of this invention in which a single heat-recovery means is employed in conjunction with the operation of a plurality of pyrolytic systems.

With reference to Figure 1, at the start of the processing cycle zone A of fixed, pebble bed 10 extends to the inlet end of the reactor and has been uniformly heated to a temperature of 1500° to 3000° F. in a manner which will be hereinafter discussed. Zone B is uniformly cool at a temperature of 100° to 300° F. To initiate the processing cycle, a gas comprising propane and ethane, for example, is introduced to the bottom of reactor 10 through lines 11, 12, 13 and 14, controlled by valves 15 and 16. All other valves, except as hereinafter noted, are closed. If desired, the hydrocarbon feed may by diluted with steam or other diluent entering via line 17, controlled by valve 18. As the feed passes upward through reactor 10, hot zone A, bounded by "cold front" 19 and "hot front" 20, also moves upward. The incoming, relatively cold (100°–300° F.) feed cools the pebbles behind the advancing "cold front" to create cold zone C. At the same time, the hot products of reaction are quenched as they pass from zone A through "hot front" 20 into cold zone B. The "hot front" moves upward as the heat contained in the reaction gases is progressively transferred to the pebbles in zone B. The cold products of reaction then leave the top of reactor 10, and pass through line 21 and open valve 22 into collection header 23 for transfer to any conventional separation means. As an alternate procedure, it may prove advantageous to withdraw the reaction products through lines 48 and 49, controlled by valve 50, in which event line 21 and valve 22 would not be required. Values 51 and 52 in lines 48 and 53, respectively, remain closed during the process cycle.

At the end of the first cycle, as hot zone A approaches the top of reactor 10, and zone B is about 1 foot or less in length, the flow of hydrocarbon feed is reversed by opening valve 24 in line 25 and closing valve 16 in line 14. At the same time, valve 22 is closed and valve 26, in line 27 leading from the bottom of reactor 10 to collection main 23, is opened. This reversal of flow must take place before cold zone B has been completely displaced from the pebble bed so that there is still sufficient cold zone to effectively quench the products of reaction below reaction temperature.

With the new flow conditions, hot zone A moves from top to bottom in reactor 10, and cold zone C now is the quenching zone. When zone C becomes so small as to be nearly ineffective, the flows can once more be reversed as described initially in the cycle.

This reversal of flow in reactor 10 can be continued until the pebble-bed temperature in zone A is reduced to a level where satisfactory conversion of hydrocarbon feed is no longer attainable. The loss in temperature level in zone A is due to heat losses through the sides of the vessel and to the large endothermic heat of reaction required in the cracking and dehydrogenation reactions occurring in zone A. Hot zone A moves as a unit in moving through the reaction vessel. In carrying out endothermic reactions, little if any spreading of the original boundaries of zone A occurs before the temperature of the zone drops below the desired conversion level. If exothermic reactions are conducted, care must be taken to insure that the original boundaries of zone A do not spread so far as to prevent quenching zones of adequate size to be maintained during the processing cycle.

As the temperature of zone A drops, it is possible to maintain a high conversion level by reducing the feed rate and/or increasing the proportion of propane in the feed, since propane is more reactive than ethane in the thermal reactions of dehydrogenation and cracking.

When it is desired to terminate the reaction cycle in reactor 10, the feed is stopped, preferably when hot zone A is near the top of reactor 10, and reactor 10 is purged with an inert gas, such as steam, at a temperature of 100°–300° F., entering via line 17, valve 18, lines 13 and 14, and valve 16. In employing a purge-gas at this temperature, a twofold result is obtained. Not only is the reaction system purged of reactants, but also quenching zone C is increased in extent to the desired length of about the initial extent of zone B. When reactor 10 has been purged sufficiently, and zone C of desired length obtained, valves 16 and 18 are closed and reactor 10 is ready for reheating to re-establish hot zone A at its original temperature and in its original position.

To provide for continuous operation, two or more pebble-beds are required, and while one bed is on its reaction cycles, the other bed is being reheated. The beds are identical in operation and construction, so, for ease of description, the reheating cycle will be described with reference to reactor 29. It is understood that reactor 29 is on a process cycle while reactor 10 is being reheated, and vice versa.

Assuming that reactor 29 is at the end of a process cycle and has been thoroughly purged, and that a satisfactory length for zone C has been established, fuel gas is admitted via line 30, controlled by valve 31. Air is simultaneously admitted via line 32 and valve 32a, and is preheated in a suitable heat exchanger to be described hereafter. The preheated air joins the fuel gas via line 34 and valve 35. Valves 36 and 37, used only during the process cycle, are closed. The hot products of combustion pass upward in reactor 29 and progressively heat the pebbles in zone D', bounded by advancing "hot front" 38. The products of combustion are cooled rapidly as they pass through "hot front" 38 from zone D' into zone C'. Zone C' corresponds to cold zone C described in the operation of reactor 10 on the process cycle.

As the cooled products of combustion travel upward, they move "cold front" 39 upward, become heated in zone A' (which corresponds to zone A in the description of the process cycle of reactor 10), and progressively move that zone up through pebble-bed 29. Prior to initiating the reheat cycle, cold zone B' (which corresponds to zone B in reactor 10 as well as part of hot zone A') has been pushed out of reactor 29 during the purging step employed subsequent to the processing cycle. Thereafter, during the reheat cycle, the remainder of hot zone A' is pushed out of the reactor through line 39 and into heat exchanger 33. The reheating cycle is terminated when cool zone C' is positioned immediately adjacent to the terminal end of the reaction vessel to effect the quenching of reaction products leaving reaction zone D', this latter zone having been created during the reheating cycle. At this point, zones C' and D' are equal in length, respectively, to zones B and A provided initially for the processing cycle. Valves 40 and 41 are used only during the process cycle and so are closed during the reheat step. If the products of combustion passing through zone A' are heated to a higher temperature than is practical for heat exchanger 33, any desired amount of cold air may be admitted through valve 42 and line 43 into line 39, in order to produce a gas temperature suitable for entry into exchanger 33.

The products of combustion are cooled in exchanger 33, leave by line 44 controlled by valve 45 and then go to a stack for final disposal. Valve 46 in line 47 is in closed position during this phase of the cycle.

Exchanger 33 may be of any suitable gas-type of heat exchanger. For example, it is possible to utilize the heat contained in the gaseous effluent emanating from the reation vessel during the reheating cycle to generate steam in a conventional waste-heat boiler. Exchangers of this type are specially designed for indirect heat exchange with a hot, gaseous medium. Also, as illustrated, the well-known Ljunstrom type of air preheater manufactured by Air Preheater Corporation can be employed to preheat air for the combustion required to reheat a portion of the pebble-bed, thereby effecting significant fuel economies. Many types of heat exchangers or waste-heat boilers which are operable when contacted by products of combustion at a temperature of about 1500° F. may be employed in this invention. However, due to the cyclic nature of pebble-bed reheating, considerable control difficulties result when attempting to efficiently utilize the periodic streams of hot combustion gases. The preferred form of heat exchanger is, therefore, a unit of the Ljunstrom type where the heat recovered can be immediately transferred to air for re-establishing the hot zone in the reactor in question. In other words, the effluent gases from the pebble-bed reactor are available at about 1500° F. at the same time that it is desired to re-establish a hot zone at a temperature of about 2000 to 3000° F. Utilization of the heat in the spent gases for reheating the bed represents a considerable saving in fuel cost, and, since the availability of the spent gases and the need for fresh, hot gases coincides, the control problem is greatly simplified.

The temperature level to which zone A is heated, and the lower temperature to which zone A may be allowed to drop before starting to reheat the bed, depend upon the conversion desired, the types of feed available for processing (i.e., the reactivity of the feeds) and the types of products desired. The maximum temperature allowable, in turn, also depends upon the materials of construction, particularly the pebbles and reactor lining.

In starting the process cycle, whether products are to be withdrawn through line 21 or line 49, it is important that reactor 10 or 29 and heat exchanger 33 or 54 be thoroughly purged with steam or some other inert gas before admitting any hydrocarbon feed so that the dangers of an explosion are eliminated. To further reduce the explosive hazard, it is advisable, when employing an exchanger of the Ljunstrom type where some leakage between the two streams is possible, to close valves 55 and 56 in lines 57 and 58, respectively, and to purge those lines and the air side of exchanger 54 at the same time that reactor 10 and the process side of exchanger 54 are being purged.

It is evident that the process described eliminates the necessity for providing any valves which must operate at excessive temperatures. Further protection of valves can be provided by introducing a small quantity of purge-steam (by means not shown) into lines 40 and 41 to protect valves 40 and 41 during the reheat cycle when line 39 is subjected to the highest temperature it experiences at any portion of its cycles.

It is also evident that a possible accumulation of hydrocarbons in exchanger 54 can be prevented during the process cycle by introducing a small amount of steam or inert gas as purge into line 48 by line 59 and valve 60.

As an illustrative, non-limiting example of the operation of my invention for the production of 100,000,000 pounds per year of acetylene, ethylene and propylene, two vertical reactors, 10 feet in internal diameter and filled with $3/16$-inch diameter, spherical, mullite pebbles to bed-depths of about 18 feet, are employed. Each of the reactors is equipped with a Ljunstrom heat exchange unit. This type of preheater operates on a continuous, regenerative, counter-flow principle. Rotating heat-transfer surfaces act as heat accumulators, and, as the rotor, which incorporates the heat transfer surface, revolves, the heat is transferred from the waste gas to the incoming cold air. During the initial heat cycle, a hot zone about 7 feet in length, measured from hte bottom of the bed, is established in one of the reactors by passing through the reaction vessel the hot gases from the combustion of natural gas and air emanating from a conventional burner coaxially disposed in the bottom of the reactor vessel. To provide the proper temperature and extent of the reaction zone, 500 m.s.c.f. hr. of air and 20.6 m.s.c.f.hr. of natural gas are admixed and burned. The combustion gases are passed through the bed for 88 minutes to produce the desired conditions. The temperature of this hot zone (zone A in reactor 10) is about 2000° F.

After a brief purging with steam, relatively pure ethane (of about 94 wt. percent purity) is introduced into the steam, the combined feed entering the reactor at the bottom. During the purging period, the hot zone will have advanced a short distance, creating cold zone C about 1 inch long in reactor 10, and correspondingly shortening cold zone B. About 5 mols of steam per mole of ethane constitute the feed. The feed reaches hot zone A, is heated to reaction temperature very rapidly, and the reaction (principally decomposition of ethane to ethylene and acetylene) takes place. The sensible heat, as well as the endothermic heat of reaction, is derived from the pebbles. As the hot products of reaction reach quench zone B, they are cooled very rapidly (in a time of less than 0.1 second) to essentially the temperature of zone B, viz., about 300° F. Generally, zone B will be at 300° F. from previous cycles of operation. If a cold reaction is started up, the portion of the pebble-bed which subsequently becomes zone B can be brought to 300° F. by burning some natural gas in a great excess of air before starting the heating cycle just described.

As heat is given up by the pebbles at the bottom of zone A, cold zone C (at 300° F., the temperature of the feed) increases in length. Hot zone A moves upward in the pebble-bed, and zone B becomes shorter. The heat of reaction tends to lower the temperature in zone A so that by the time zone A has moved upward to its limit of travel, the temperature is about 1800° F. The upper travel is limited so as to leave zone B of sufficient length to adequately quench the reaction products. Thus, when zone B is about 2 feet in length, valves 16 and 22 are closed and valves 24 and 26 are opened, reversing the flow through the bed. The hot, or reaction, zone A now is moved downward, and zone C becomes the quenching zone.

As the temperature in zone A drops, the quantity of ethane is gradually reduced to a minimum rate of 2 mols per mol of steam to permit longer residence in the hot zone in order to maintain a high conversion of the feed. As the temperature in zone A drops still more, starting at about 1700° F., propane in the amount of 0.5 mols per mol of steam is substituted for the ethane in increasing amounts to a maximum of about 2 mols of propane/mol of steam so that when the temperature in zone A reaches about 1600° F., the feed consists essentially of propane and steam in this latter ratio. When the temperature of zone A is too low (about 1500° F.) to give good conversions of the propane feed, the propane feed is stopped, and the steam flow is continued long enough to purge the reactor and heat exchanger 54 above it. At the end of the process cycle, the length of hot zone A increased to about 8 feet, providing an upper quench zone about 2 feet in length and a lower quench zone about 8 feet deep. This spreading of reaction zone A still permits quench zones of adequate size to be maintained during this cycle.

It is preferred to end the process cycles at a time when residual hot zone A is near the top of the reactor so that zone C is larger than zone A. Then, in the reheat cycle, as new zone A is introduced by the products of combustion, zone C becomes zone B and is of sufficient length to be an effective quenching zone as a result of the adjustment in length during the purge step.

For the manufacture of 100,000,000 lb./yr. of acetylene, ethylene, and propylene, for example, an overall feed of 483 m.s.c.f./hr. of ethane and 2660 gal./hr. of propane are reacted to yield a reactor effluent with an average composition, taken over the entire conversion period, as follows (dry basis):

| | Mole percent |
|---|---|
| $CH_4$, $H_2$, inerts | 55.1 |
| $C_2H_2$ | 5.5 |
| $C_2H_4$ | 27.5 |
| $C_2H_6$ | 1.8 |
| $C_3H_6$ | 6.0 |
| $C_3H_8$ | 1.2 |
| $C_4$'s+ | 2.9 |
| | 100.0 |

From the description and example given, it is evident that the highest temperatures encountered, in the range of about 1500 to 3000° F., and preferably 1500 to 2000° F., are present only within the reactors. Owing to the quenching properties of the cold zones at either end of the reactor during the process cycles, the products always leave the reactors essentially at the same temperatures as the feed, about 100 to 300° F., or as desired. During the reheat cycle, the residual hot zone is moved out of the reactor at a temperature in the range of about 1500 to 1800° F., but by use of tempering air the exchanger on top of the reactor can be protected from excessive temperatures, and the valves near the reactor top outlet line can be readily protected, by means of water cooling or the introduction of a small quantity of cold purge-gas or steam. The valve controlling the flow of products of combustion being transferred from the heat exchanger to the stack contacts the gases only after they have been cooled in the exchanger.

Another embodiment of my invention is shown in Figure 2. In this embodiment, a single heat-recovery means is used and the reactors are manifolded to it. In this case, valves 100 must be provided to shut off flow from the reactors to the heat exchanger during the processing cycles, but, since the reactor effluent is extremely hot only during the reheating period, tempering air may be admitted during this short time at the points indicated to protect other valves and closed valves 100. The manipulation of the various flow-control devices required to effectuate the objectives of this invention is obvious in view of the foregoing discussion of the process illustrated in Figure 1. Accordingly, to avoid unnecessary repetition, a detailed explanation of this process scheme will be omitted.

It is evident that appropriate instrumentation can be employed to effect automatic changes in the direction of flow of the feed stock during the processing cycle. For example, a radiation thermometer appropriately positioned adjacent to the ends of the heater unit can be employed as a sensing element to insure that a quenching zone of sufficient extent is maintained during the processing cycle. Similarly, automation can be employed during the intermediate purging step and reheating cycle to insure an appropriate adjustment of the various flow-control means which are employed.

In selecting the size of the granular aggregate employed as the heat-transfer means, it is taught in the prior art that a compromise must be made between a sufficient heat transfer in a heat-bed of several feet thickness, employing small, granular heat-transfer means, and the low-pressure drop or larger flows of air per square foot of cross-section of a heater employing larger diameter heat-transfer means. In general, aggregates having diameters of $\frac{1}{16}$ to 3″ have satisfactory thermal conductivities. This aggregate is preferably prepared from alumina; however, other prior art refractory materials, such as quartz, silica, sandstone, dolomite, and magnesium oxide, can be used.

In order to prevent partial fluidization of the aggregate mass, the velocity at which the reactant and product vapors flow through the mass must be limited. This limit will depend upon the size of pellets employed. For example, it has been reported that in employing ½″-diameter, heat-transfer aggregate, a flow rate of 260 cu. ft. per minute per square foot of cross-section at 1900° F., can be employed. High rates of flow also result in excessive pressure drops through the bed of heat-transfer material which are objectionable. In general, mass flow rates of between about 100 to 2500 pounds per hour per square foot of cross-section can be employed, but the most expeditious rate will depend upon pellet size, pressure-drop effect, fluidization, and velocity. The reactor vessels which are employed should be designed to keep the ratio of the height to diameter in the pebble-bed within reasonable proportions. Vertical, cylindrical vessels are especially well-suited for use as the processing vessels in which the heat-transfer aggregate is disposed. For operation at temperatures up to about 3100° F., alumina refractories can be employed for lining the heater. If higher temperatures are desired, linings such as magnesia (97%) should be used.

In processes of this type, diluents such as steam can be employed to reduce the partial pressure of the hydrocarbons and minimize polymerization reactions. A further function of the added diluent is to act as a heat-carrying medium to supply a part of the heat required by the high endothermic heats of reaction. In certain processes wherein hydrogen is available in the tail-gas or reaction effluent, it may be preferred to employ hydrogen rather than steam. Hydrogen is particularly advantageous since it has a very high heat capacity, can be manufactured in a hydrocarbon conversion process, does not react appreciably with the hydrocarbons under reaction conditions (whereas steam consumes some of the hydrocarbons in the water-gas reaction to form carbon oxides and hydrogen), and is already a gas so that better heat economies are obtainable because no large heat of vaporization is required as is for steam generation (which heat of vaporization is not recoverable due to the low pressures desired in the proces). In addition, other diluents can be used if desired.

In general, the process of this invention can be applied to a variety of chemical reactions in which fluid reactants such as hydrocarbons are thermally decomposed, or other reactants, such as those suggested above, are processed or converted into useful chemicals. These processes can be carried out at temperatures in excess of about 3000° F. The pyrolytic process of this invention is preferably operated at atmospheric pressure, although other pressures can be employed. By suitably varying aggregate or pebble size, mass velocities of reactants and diluent, reaction temperature, length of hot zone, and pressure, contact times in the reaction zone and time maintained at reaction temperature can be adjusted over a wide range. The process of the invention will find greatest utility where very high temperatures, low contact times, and rapid quenching are necessary. The conversion of light hydrocarbons, such as ethane, propane, and heavier constituents, to ethylene and acetylene is best carried out at contact times of less than 1 second, preferably about 0.1 second or less, and at temperatures in the range of 1600–3000° F.

The intermediate purge step can be carried out as described in the illustrative example as well as by employing alternate, inert purge-gases. For example, flue gas is a suitable purging medium. Purge-gas temperatures of about 100°–300° F. are preferred, but cooler gases can be used.

In the reheating cycle, heated gases for reheating the reaction zone may be provided by conventional combustion means. Fuel gases such as natural gas, coke-oven gas, water-gas, etc., admixed with a free-oxygen-containing gas, such as air, oxygen, etc., are preferred. In controlling the temperature of the combustion gases, adjustments can be made in the ratio of fuel gas to oxygen. Conventional burners such as those illustrated in Chemical Engineer's Handbook, Perry, can be used.

It is evident that various modifications of the foregoing process will be evident to those skilled in the art. Accordingly the instant invention is limited only as defined by the appended claims:

I claim:

1. In a continuous, fixed-bed, regenerative, pyrolytic, gas-conversion process utilizing an alternating processing cycle and reheating cycle and employing a reaction vessel having disposed therein a granular mass of refractory, heat-transfer medium, which at the end of a process cycle is divided into a first quenching zone adjacent to one terminal end of said reaction vessel, said zone having a length sufficient to provide at least minimum efficiency for quenching heated reaction effluent, an intermediate hot zone at a temperature below desired conversion level, and a second quenching zone adjacent to the other terminal end of said reaction vessel, the improvement in carrying out the reheating of said granular mass to provide a reaction zone heated to conversion temperatures, and to position immediately adjacent to said reaction zone a quenching zone of suitable efficiency for reducing the temperature of reaction effluent to substantially below conversion temperature, said improvement comprising purging said reaction vessel with a cool, inert, gaseous purging medium to increase the length of the second quenching zone to provide a zone having maximum quenching efficiency and thereafter introducing through the terminal end of said reaction vessel immediately adjacent to the second quenching zone a gaseous, heat-transfer medium heated to a temperature substantially in excess of the desired conversion temperature, passing the gaseous, heat-transfer medium through said reaction vessel in heat exchange with said granular mass and directly to an indirect, gas-type, heat-exchange means without controlling the flow of the effluent, heat-transfer medium to cool and exhaust the same, and continuing to pass said gaseous, heat-transfer medium through said reaction vessel until there is provided in the reaction vessel a quenching zone immediately adjacent to one terminal end of said reaction vessel and a reaction zone immediately adjacent to the other end of said reaction vessel.

2. In a continuous, fixed-bed, regenerative, pyrolytic, gas-conversion process employing a reaction vessel having disposed therein a granular mass of refractory, heat-transfer medium, the steps which comprise heating a portion of said heat-transfer medium to an elevated temperature to provide a heated reaction zone at one end of said reaction vessel while maintaining a first quenching zone at the other end of said reaction vessel, introducing into said one end of said reaction vessel a relatively cool fluid reactant stream to be pyrolyzed by contact with said reaction zone, continuing the flow of said fluid stream through said reaction vessel whereby said reaction zone progressively moves toward said other end of said reaction vessel and forming a second quneching zone adjacent to said one end of said vessel, terminating flow of the fluid stream when said first quenching zone has been reduced in length to a size of minimum efficiency for effecting the cooling of effluent from said reaction zone to a temperature sufficiently below reaction temperature to minimize undesirable side reactions, reintroducing said fluid stream into said other end of said vessel to successively pyrolyze and quench said stream until the interface between said reaction zone and said second quenching zone has moved to a point where said second quenching zone has been reduced to a size of minimum efficiency for effecting the cooling of effluent from said reaction zone to a temperature sufficiently below reaction temperature to minimize undesirable side reactions, thereafter alternating the direction of flow of the fluid reactant stream through said reaction vessel until the temperature of said reaction zone decreases below a desired conversion level, terminating the flow of the fluid reactant stream, purging said reaction vessel by introducing an inert purge-gas through said second quenching zone, continuing said purging until the reaction vessel is free from reactants and reaction products and said second quenching zone is increased to a length substantially the same as the initial length of said first quenching zone, introducing at said one end of said reaction vessel a gaseous, heat-transfer medium heated to an elevated temperature substantially in excess of the desired conversion level, passing said heat-transfer medium through said reaction vessel in heat exchange with said granular mass and thence into an indirect, gas-type, heat-exchange means to cool and exhaust the same, and continuing to pass said gaseous, heat-transfer medium through said reaction vessel until said second quenching zone has moved to the space adjacent to said other end of said reaction vessel and heated reaction zone is formed immediately adjacent to said one end of said reaction vessel.

3. In a continuous, fixed-bed, regenerative, pyrolytic, gas-conversion process employing a reaction vessel having disposed therein a granular mass of refractory, heat-transfer medium, the steps which comprise heating a portion of said heat-transfer medium to a temperature of 1800–3000° F. to provide a heated reaction zone at one end of said reaction vessel and leaving a cool, first quenching zone at the other end of said reaction vessel substantially longer than said reaction zone, introducing into said one end of said reaction vessel a fluid reactant stream at a temperature of about 100°–300° F. to be pyrolyzed by contact with said reaction zone, continuing the flow of said fluid stream through said reaction vessel whereby said reaction zone progressively moves toward said other end of said reaction vessel and forming a second quenching zone adjacent to said one end of said vessel, terminating flow of the fluid stream when said first quenching zone has been reduced in length to a size of minimum efficiency for effecting the cooling of effluent from said reaction zone to a temperature sufficiently below reaction temperature to minimize undesirable side reactions, reintroducing said fluid stream into said other end of said vessel to successively pyrolyze and quench said stream until the interface between said reaction zone and said second quenching zone has moved to a point where said second quenching zone has been reduced to a size of minimum efficiency for effecting the cooling of effluent from said reaction zone to a temperature sufficiently below reaction temperature to minimize undesirable side reactions, thereafter alternating the direction of flow of the fluid reactant stream through said reaction vessel until the temperature of said reaction zone decreases below a desired conversion level, terminating the flow of the fluid reactant stream, purging said reaction vessel by introducing an inert purge-gas through said second quenching zone, continuing said purging until the reaction vessel is free from reactants and reaction products and said second quenching zone is increased to a length substantially the same as the initial length of said first quenching zone, admixing a fuel gas and an oxygen-containing gas to provide a gaseous, combustible mixture, igniting said mixture to produce heated combustion gases, introducing said combustion gases at said one end of said reaction vessel, passing said combustion gases through said reaction vessel in heat exchange with said granular mass and thence into an indirect, gas-type, heat-exchange means to cool and exhaust the same, and continuing to pass said combustion gases through said reaction vessel until said second quenching zone has moved to the space adjacent to said other end of said reaction vessel and a heated reaction zone is formed immediately adjacent to said one end of said reaction vessel which is smaller than said second quenching zone.

4. A continuous, fixed-bed, regenerative, pyrolytic process for the conversion of $C_2$ and $C_3$ hydrocarbons to unsaturated hydrocarbons, using a first reactor and a second reactor, each having disposed therein a granular mass of refractory, heat-transfer medium, which comprises passing a fluid heat-transfer medium at an elevated temperature through said granular, heat-transfer medium disposed in said reactors to provide a reaction zone at a temperature of about 2000°–2500° F. at one end of said reaction vessels and a quenching zone longer than the reaction zone at the other end of said reactors, introducing into said reaction zone a gaseous $C_2$–$C_3$ hydrocarbon feed, at a temperature of 100°–300° F. and at a rate sufficient to provide a residence time of less than one second in said reaction zone, through the one end of said reaction vessel, continuing to pass reactants and products through said reaction zone whereby said reaction zone, substantially as a unit, moves progressively toward the other terminal end of said reaction vessel and there is created a second quenching zone at said one end of said reaction vessel, terminating the introduction of the gaseous hydrocarbon feed when said first quenching zone has been reduced in length to a size of minimum efficiency for effecting the cooling of effluent from the reaction zone to a temperature sufficiently below reaction temperature to minimize undesirable side reactions, reintroducing the gaseous, hydrocarbon feed at a temperature of 100°–300° F. and at a rate sufficient to provide a residence time of less than 1 second within said reaction zone through said other end of said reaction vessel to successively pyrolyze and quench said feed until the interface between said reaction zone and said second quenching zone has moved to a point where said second quenching zone has been reduced to a size of minimum efficiency for effecting the cooling of effluent from said reaction zone to a temperature sufficiently below reaction temperature to minimize undesirable side reactions, thereafter alternating the direction of flow of the fluid reactant stream through said reaction vessel until the temperature of said reaction zone decreases to about 1800° F., terminating the flow of the fluid reactant stream, purging said reaction vessel by introducing an inert, purge medium through said second quenching zone, continuing the flow of inert, purge medium until the reaction vessel is free from reactants and reaction products and said second quenching zone is increased to a length substantially the same as the initial length of said first quenching zone, introducing at said one end of said reaction vessel a gaseous, heat-transfer medium heated to an elevated temperature substantially in excess of 2000°–2500° F., passing said heat-transfer medium through said reaction vessel in direct heat exchange with said granular mass and thence into an indirect, gas-type, heat-exchange means to cool and exhaust the same, and continuing to pass said gaseous, heat-transfer medium through said reaction vessel until said second quenching zone has moved to the space adjacent to said other end of said reaction vessel and a heated reaction zone is formed immediately adjacent to said one end of said reaction vessel, said hydrocarbon feed being passed through one of said reactors while the other reactor is being purged and heated, and the flow of hydrocarbon feed being transferred to the freshly heated reactor at the end of a reaction cycle for further reaction while the spent reactor is purged and reheated.

5. A process in accordance with claim 3 in which said free-oxygen-containing gas is preheated in said indirect heat-exchange means and is employed in preparing said gaseous, combustible mixture.

6. A process in accordance with claim 4 in which steam is admixed with said gaseous hydrocarbon feed in the ratio of 0.5 to 5 moles of steam per mol of hydrocarbon feed.

7. A process in accordance with claim 6 in which said gaseous, hydrocarbon feed consists essentially of ethane.

8. A process in accordance with claim 7 in which incremental amounts of propane are admixed with the ethylene which is proportionately decreased when the conversion temperature is decreased to about 1800° F. and the processing cycle continued until the temperature of the reaction zone decreases to about 1500° F.

References Cited in the file of this patent

UNITED STATES PATENTS

| | | |
|---|---|---|
| 2,421,744 | Daniels et al. | June 10, 1947 |
| 2,512,259 | Pike | June 20, 1950 |
| 2,629,753 | Frevel et al. | Feb. 24, 1953 |
| 2,692,819 | Hasche et al. | Oct. 26, 1954 |
| 2,776,872 | Norton | Jan. 8, 1957 |